Aug. 26, 1947.  G. C. HARTLEY  2,426,209
MEANS FOR READING THE INDICATION OF MEASURING INSTRUMENTS
Filed July 20, 1943
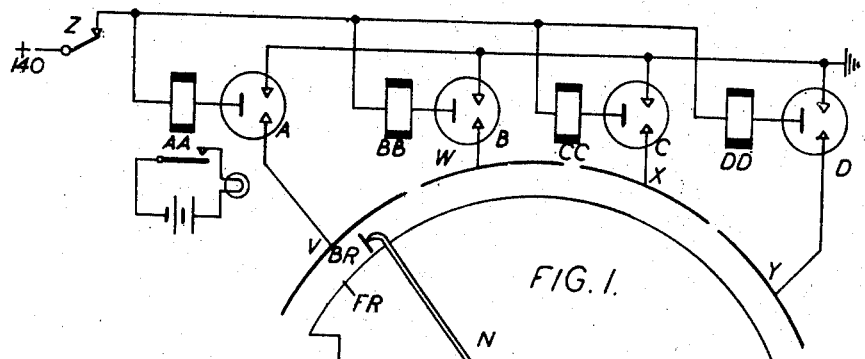
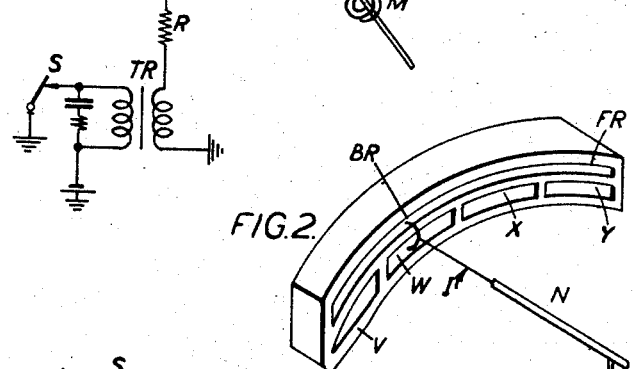
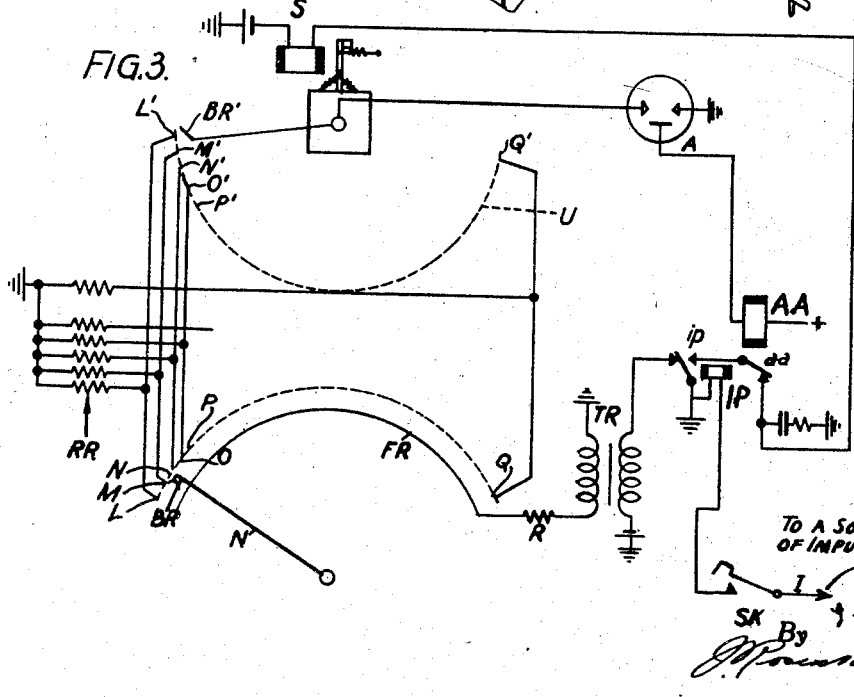
Inventor
G. C. Hartley
By
Attorney Patented Aug. 26, 1947

2,426,209

UNITED STATES PATENT OFFICE 2,426,209

MEANS FOR READING THE INDICATION OF MEASURING INSTRUMENTS

George Clifford Hartley, London, England, assignor, by mesne assignments, to International Standard Electric Corporation, New York, N. Y., a corporation of Delaware Application July 20, 1943, Serial No. 495,540
In Great Britain September 12, 1942

Section 1, Public Law 690, August 8, 1946.
Patent expires September 12, 1962

2 Claims. (Cl. 177—351)

This invention relates to an arrangement for indicating the position of the pointer of an indicating instrument.

It is often necessary to obtain at a distance from an indicating instrument an indication of the reading of the instrument or an indication when the pointer or other moving member of the instrument has reached a predetermined position. Devices are known in which the pointer or other moving member makes contact to close an electric circuit and it is known to cause the pointer to make such contact at an instant at which it is desired to ascertain its position by energising a magnet which attracts the needle and causes it to make contact with one of a number of contact studs. These devices are, however, inapplicable to the more sensitive and delicate types of instrument, for example, electric microammeters or high resistance voltmeters.

It is an object of the present invention to provide a simple means of reading the position of a pointer to a reasonable degree of accuracy without impairing the sensitivity of the instrument.

According to this invention an arrangement for indicating when the pointer of an indicating instrument is in a given position comprises an electrode situated juxtaposedly to the pointer when it reaches said position, means for applying an electric potential between said electrode and an electrode carried by said pointer and means for indicating the passage of a spark between said electrodes.

It is an essential part of the invention that the two electrodes should not come into mechanical contact with one another.

The potential may not be directly applied to the electrode carried by the needle, but the latter may carry an electrode which moves close to but not in contact with a commutator consisting of an undivided segment close to one end of the electrode and to which a potential is applied and a divided segment having as many portions as there are positions to be indicated and close to the other end of the electrodes.

The arrangement according to the invention may be used to give an indication when the pointer has reached a single given position or may be used to indicate which of a plurality of given positions has been reached by the pointer, or may be used to give a continuous indication of the positions of the pointer.

The nature of the invention will be better understood from the following description taken in conjunction with the accompanying drawings in which Fig. 1 is a circuit diagram showing the application of the arrangement according to the invention to a simple case of determining in which of four predetermined portions of the scale of an instrument the pointer is standing.

Fig. 2 shows one way in which the electrodes on the needle and those external thereto may be arranged.

Fig. 3 shows diagrammatically an arrangement for indicating which of a large number of positions is occupied by the pointer of an instrument.

Referring to the drawings, and more particularly to Fig. 1, the needle of an electric voltmeter or ammeter the deflecting system of which is not shown, is replaced by an insulating needle N and attached to this needle is a very light brush BR. As the needle moves the brush BR is moved in close proximity to a feeder ring FR and to a series of segments V, W, X and Y. Each of these segments is connected to the control electrode of a corresponding cold cathode gas-filled electric discharge tube A, B, C or D.

The anodes of the several tubes are connected to an appropriate positive potential through respective relays AA, BB, CC and DD. The cathode of each tube is connected to earth. The feeder ring FR is connected to the secondary of a spark coil TR through a resistance R, the other terminal of the secondary being earthed. The primary of the spark coil TR is normally connected between a battery and earth via a switch S. When it is desired to ascertain the position of the pointer, the switch S is opened and a high voltage is developed in the secondary which causes a spark to jump between the feeder ring FR and the brush BR, and between the brush BR and the particular segment V, W, X or Y adjacent to which the brush BR is positioned. This spark causes ionisation of the associated tube causing it to flash over and operate the anode relay. This relay may be used to perform external functions in accordance with the particular position of brush BR in whatever manner is desired. When these functions have been performed the anode circuit may be opened by operating a relay contact Z so as to extinguish the arc in the tube. The relay contact Z is then again closed before the next indication is desired.

Fig. 2 shows a practical manner of arranging the brush and commutator. The needle N is a hollow tube and a fine glass filament I is cemented into the end of the needle N. A brush BR in the form of a U-shaped piece of fine wire is carried by the filament I and is positioned a short distance, say 1/32 of an inch, from a circular commutator mounted concentrically of the needle pivot. This commutator is in the form of an individual segment FR and a segment divided into the required number of segments insulated from one another. The potential applied to the segment FR induces a potential on the brush BR so that when it is desired to read the position of the pointer or needle N there is a potential between the brush BR and one of the segments of the divided ring.

Figure 3 shows an arrangement for checking the position of the pointer of an instrument to closer limits than is shown in Figs. 1 and 2, with the use of only one gas-filled discharge tube A.

The divided ring of the commutator is provided with as many segments L, M, N, O, P, . . . Q as are necessary for the required closeness of reading and each segment is connected to one of the bank of contacts L', M', N', O', P' . . . Q' of a switch U of the type known in automatic telephone exchange systems as a uniselector, i. e. a switch with only one selective motion. The wiper BR' of this switch is connected to the control electrode of tube A, the cathode of which is connected to earth, and the anode of which is connected to positive potential over a relay AA. When it is desired to take a reading, a key SK is operated to connect a relay IP to a lead I to which impulses, consisting of makes and breaks of the circuit are applied. At each energization of relay IP the circuit of the primary of transformer TR is broken by its contacts ip inducing a high voltage across the secondary, which is applied to the continuous ring FR of the commutator and induces a potential on the brush BR. Also each time relay IP operates, contacts ip operates the magnet S of the uniselector U, and at each de-energization of relay IP, contacts ip break the circuit of magnet S to step the wiper of the uniselector U on to the next contact of the bank of contacts L', M', N', O', P', . . . Q'. The segments L, M, N, O, P, . . . Q of the commutator are connected to earth over individual high resistances RR, so that at each break of the primary of transformer TR a spark passes from the brush BR to the segment opposite the brush and is dissipated in the appropriate resistance RR. When the wiper BR' of the uniselector U arrives on the contact connected to the segment nearest the brush BR, the potential induced on this segment will initiate a discharge in the tube A and cause the operation of relay AA, which, at contacts aa opens the circuit of the magnet S and prevents further stepping. Other contacts of relay AA (not shown) may then be used in conjunction with a further bank of contacts of the uniselector U to perform any desired function dependent upon the position of the pointer N of the instrument.

It is clear that the arrangements above described may be adapted for many different purposes. For example, the impulses may be applied to relay IP as a result of a signal from a distant station, whilst the position taken up by the wiper of the uniselector U may be signalled back to the distant station in any known manner. In the alternative where it is required to exercise continuous supervision over a meter and to detect any tendency for it to rise above or fall below a given reading appropriately arranged segments may be connected to control tubes and the transformer TR may be connected in such manner as to provide a steady stream of sparks at intervals appropriate to the probable frequency of alterations in the meter movement. The interval between the sparks may thus vary according to the required conditions from several times a second to once every hour or greater period.

It is to be noted that the voltage to be applied to the segment FR and the series resistance RR must be so chosen that though an ample reserve of voltage for causing a discharge in tube A is developed, the current in the spark is strictly limited in order to avoid any deterioration of the brush. This is possible because modern gas discharge tubes are capable of operation on currents of the order of a few microamperes.

What is claimed is:

1. Electro-responsive means for indicating when the pointer of an indicating instrument is in a given position comprising in combination with the pointer a piece of fine wire mounted on the pointer and insulated therefrom, a commutator consisting of an undivided segment and a divided segment arranged in juxta-position to the path of movement of said wire and to be bridged thereby, circuit means for applying a potential across the segments through said wire, high resistances connecting the divided segments to ground, a uni-selector having a series of contacts, connections from the divided segments to the series of contacts, a wiper for the series of contacts of the uni-selector, means for applying a potential intermittently to step the wiper, a cold cathode gas filled discharge tube having a control electrode connected to said wiper whereby the potential of the control electrode with respect to the cathode is raised by passage of the spark to one of the divided segments when the wiper is connected to the corresponding contact of the uni-selector, means energized by the circuit of the gas discharge tube for indicating the closing of the circuit through the divided segment, means controlled by said indicating means for effecting stopping of the wiper movement, and means for opening the circuit of the gas discharge tube.

2. Electro-responsive means for indicating when the pointer of an indicating instrument is in a given position comprising in combination with the pointer, a fine wire conductor mounted on the pointer and insulated therefrom, a commutator consisting of an undivided segment and a divided segment arranged in juxta-position to the path of movement of said conductor and to be bridged thereby, circuit means for applying a potential across the segments through said conductor, means for indicating the passage of a spark across the segments consisting of a cold cathode gas filled tube having a control electrode connected to be raised in potential with respect to the cathode by the passage of a spark, a uni-selector, connections from the divided segments to the uni-selector contacts, a wiper for the uni-selector connected to the control electrode, grounded resistances connected to the segment to contact connections, energizing circuit means for applying a potential to the undivided segment and relay actuated means energized by the discharge tube and operative to open the energizing circuit.

GEORGE CLIFFORD HARTLEY.

REFERENCES CITED

The following references are of record in the file of this patent:

UNITED STATES PATENTS

| Number | Name | Date |
|---|---|---|
| 2,062,269 | Knowles | Nov. 24, 1936 |
| 1,877,607 | Skellett | Sept. 13, 1932 |
| 1,350,334 | Radtke | Aug. 24, 1920 |

FOREIGN PATENTS

| Number | Country | Date |
|---|---|---|
| 356,211 | Great Britain | Sept. 4, 1931 |